July 21, 1970 W. J. COX 3,521,254

MAGNETIC CORE STORES

Filed July 17, 1967

Inventor
W. J. COX
By
Cameron, Kerkam & Sutton
Attorneys 3,521,254

MAGNETIC CORE STORES

William John Cox, Crowthorne, England, assignor to Ferranti, Limited, Hollinwood, England, a company of the United Kingdom of Great Britain and Northern Ireland Filed July 17, 1967, Ser. No. 653,736
Claims priority, application Great Britain, July 21, 1966, 32,811/66
Int. Cl. G11c 5/02, 5/08
U.S. Cl. 340—174 10 Claims

ABSTRACT OF THE DISCLOSURE

A multiple-plane coincident-current magnetic core store having the inhibit wire of each plane switched at its midpoint.

This invention relates to multiple-plane coincident-current magnetic core stores.

Magnetic core stores of the multiple-plane coincident-current type are provided with two sets of input wires, usually referred to as the X and Y wires, which are common to all the planes in the store. One X wire and one Y wire together define the location of one core in each plane. Each plane in the store is also provided with its own sensing wire and inhibit wire, each of these being threaded in a particular manner through all the cores in that plane. The sensing wire provides an output voltage pulse whenever a core in that plane changes from one to the other of its two stable states. The inhibit wire is provided in order that the change of state of a core in that plane may be prevented. The inhibit wire is connected through a current-limiting device, for example a resistance, and a switching device to a source of potential.

When a core in the plane changes its state, a small differential signal voltage is induced in the sense wire. This voltage may, for example, be of the order of 50 mv., and is amplified by a differential amplifier known as the sense amplifier. However, when the current in the inhibit wire is switched on or off, a common-mode noise voltage appears on both ends of the sense wire due to capacitive coupling between the inhibit wire and the sense wire. This voltage, normally referred to as "inhibit noise," may be of the order of several volts.

The magnitude of the inhibit noise voltage presents a considerable problem when designing the sense amplifier. Although the noise voltage does not occur at the same time as the wanted signal voltage and may therefore be eliminated by suitable strobing within the sense amplifier, the magnitude of the noise voltage may be such as to seriously overload the common-mode rejection capability of the sense amplifier. As a result the sense amplifier may take an appreciable time to recover sufficiently to ensure correct interpretation of the wanted signal. This will necessarily result in a reduction of the speed of operation of the core store as a whole.

The object of the invention is to provide a multiple-plane coincident-current magnetic core store in which the inhibit wire of each plane is arranged in such a manner that the noise voltage produced in the sensing wire when the inhibit current is switched on and off is substantially reduced.

According to the present invention there is provided a multiple-plane coincident-current magnetic core store of the type wherein each plane is provided with an inhibit wire threaded through all the cores in that plane, in which a switching device is inserted into each inhibit wire in such a position that the parts of the inhibit wire on either side of the switching device are each threaded through half of the cores in said plane, the two ends of the inhibit wire being connected to opposite poles of a source of potential.

The invention will now be described with reference to the accompanying drawings, in which.

Figure 1:
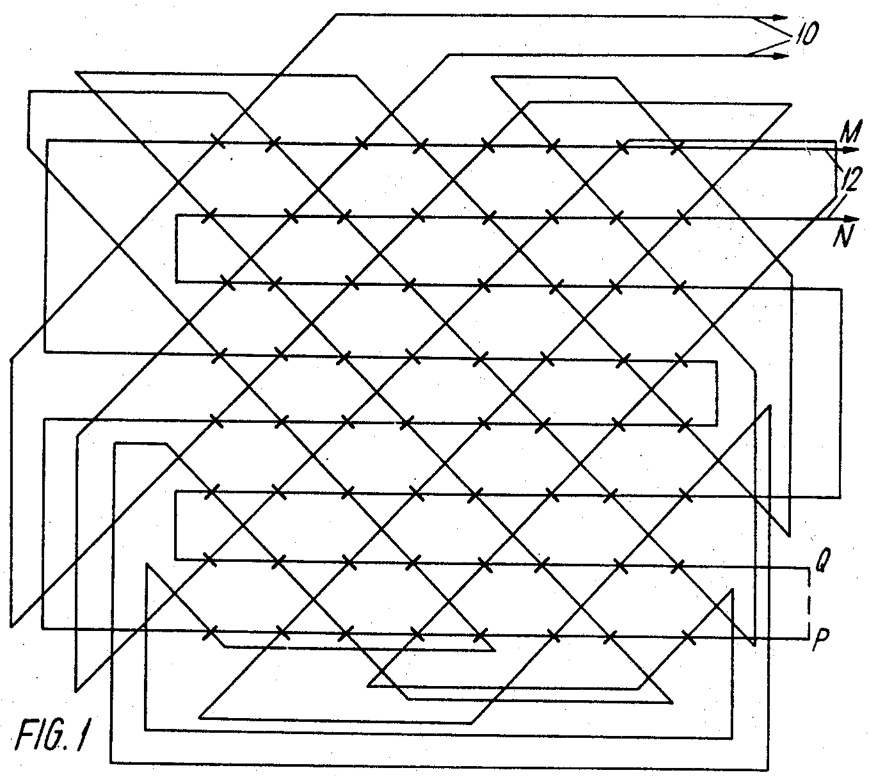
FIG. 1 is a schematic diagram of one plane of a core store, showing the inhibit and sensing wire configurations.

Referring now to FIG. 1, this shows a plane of core stores comprising 64 cores arranged in columns and rows. A sensing wire 10 is threaded through the cores in a diagonal direction, as shown, and is connected to a sense amplifier (not shown). An inhibit wire 12 is threaded through the rows of cores. The inhibit wire 12 has two ends M and N and a midpoint PQ. The length of wire from M to P passes through half the cores in the plane, and the length from N to Q passes through the remaining cores. X and Y input wires are also provided, though not shown. The X wires pass along the columns of cores in the plane whilst the Y wires pass along the rows of cores in the plane.

Figure 2:
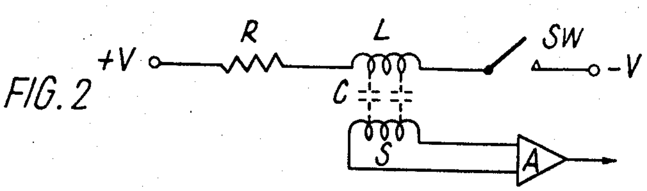
FIG. 2 shows the usual method connection of the inhibit wire.

In conventional arrangements the inhibit wire of FIG. 1 is in one length, there being no break at point PQ. FIG. 2 shows the usual method of connection. The wire is represented by a winding L. A current-limiting resistance R is connected in series with the wire L, and the combination is connected through a switch *Sw* to the poles of a source of potential of, say, 2V volts.

The sense wire is also shown, to illustrate the distributed capacitive coupling which is present between the sense wire and the inhibit wire. The sense amplifier is shown at A, the sense wire is shown as a winding S, and the distributed capacitance by capacitors C. When the switch *Sw* is open, all parts of the wire L are at the potential +V. When the switch is closed the end of the wire nearest to the switch falls to a potential of −V, whilst the other end of the wire ultimately falls to some intermediate potential which depends upon the voltage drop across the resistance R. Similarly the potential of the end of the wire nearest to the switch will rise when the switch *Sw* is opened again. It is these voltage swings which gives rise to the large noise voltage.

Figure 3:
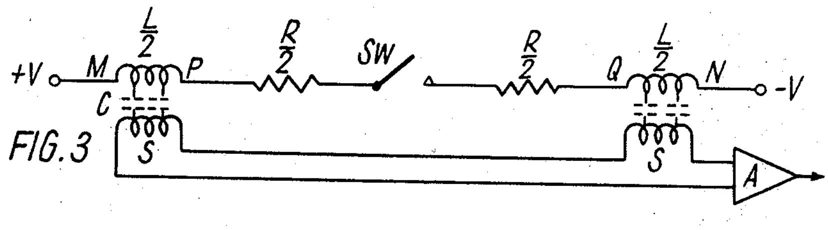
FIG. 3 shows one connection of the inhibit wire according to the invention.

FIG. 3 illustrates one arrangement of the inhibit wire according to the invention. The inhibit wire is divided into two parts at point PQ of FIG. 1. The ends M and N of the two parts of the inhibit wire are connected to the source of potential. The limiting resistance R is replaced by two resistances of value $R/2$ and these are inserted at point PQ, with the switch *Sw* connected between them. The sense wire and distributed capacitive coupling are shown as before. Considering the arrangement of FIG. 3, when the switch Sw is open the potential at any point of the part of the wire between M and P will be +V, and that of the wire between N and Q will be −V. When the switch is closed, the potential at P and Q will be the potentials at M and N minus the slight voltage drops across the half-sections of the inhibit windings. The same current I flows through both parts of the wire and both resistances, and hence equal voltage drops will occur on each side of the switch, since the impedances of the two parts of the inhibit wire are equal. Thus the voltage swing which occurs at any point of one part of the inhibit wire will be matched by an equal voltage swing occurring at a corresponding point of the other part of the wire. However, the voltage swings in the two parts of the inhibit wire will be of opposite sense since the end Q of the wire will fall in potential when the switch Sw is closed, whilst the end P of the wire will rise in potential by an equal amount. As a result, the noise voltages produced in the sensing wire by the two halves of the inhibit wire will substantially cancel one another.

Figure 4:
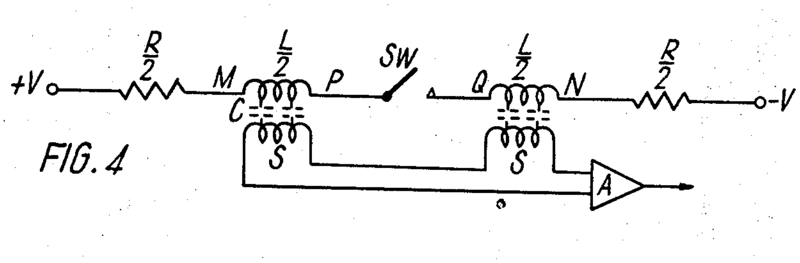
FIG. 4 shows an alternative connection of the inhibit wire.

FIG. 4 shows an alternative arrangement in which the ends P and Q of the two parts of the wire are connected directly to the switch Sw, whilst the ends M and N are connected through the two limiting resistances to the source of potential. The effect of this connection will be exactly the same as the described above, though the actual voltages appearing on the inhibit wire may be different.

The invention has been described with reference to one particular winding arrangement of the inhibit wire. However, it is equally applicable to other arrangements. The potentials +V shown in FIGS. 2 to 4 are by way of example only. The two potentials may be of any required value, and need not be symmetrical about earth potential.

Although shows as a manually-operated switch, the switching device Sw will usually be of a more complex type, such as a transistor switch.

A single current-limiting resistance may be used in place of the two limiting resistances described above. Alternatively the current-limiting device need not be a resistance; a constant-current source may be used.

What I claim is:

1. A multiple-plane coincident-current magnetic core store of the type wherein each plane is provided with an inhibit wire threaded through all the cores in that plane, in which a switching device is inserted into the inhibit wire in series therewith and in such a position that the parts of the inhibit wire on either side of the switching device are each threaded through half of the cores in said plane, the two ends of the inhibit wire being connected to opposite poles of a source of potential.

2. A magnetic core store as claimed in claim 1 in which a current-limiting device is connected in series with the inhibit wire.

3. A magnetic core store as claimed in claim 2 in which the current-limiting device is a resistance.

4. A magnetic core store as claimed in claim 3 in which said resistance is divided into two equal portions, one of said portions being connected in series with each of said parts of the inhibt wre.

5. A multiple-plane coincident-current magnetic store comprising a plurality of cores arranged in columns and rows in each plane, a sensing wire in each plane threaded through the cores in that plane, an inhibit wire in each plane threaded through the cores in that plane, a switching device connected at a point in said inhibit wire such that said inhibit wire has two parts connected in series through said switching device and two ends, each part being threaded through half of the cores in said plane and the two ends being brought out from said plane for connection to opposite poles of a source of potential.

6. A magnetic store as set forth in claim 5 wherein said inhibit wire and sensing wire in each plane are separate.

7. A magnetic store as set forth in claim 5 wherein said two ends are directly connected to the opposite poles of a source of potential.

8. A magnetic store as set forth in claim 5 further including a current-limiting device connected in series with said inhibit wire.

9. A magnetic core store as set forth in claim 8 wherein said current-limiting device is a resistive element.

10. A magnetic core store as set forth in claim 9 wherein the resistance of said element is divided into two equal portions, one of said portions being connected in series with each of said parts of the inhibit wire.

References Cited

UNITED STATES PATENTS

| | | | |
|---|---|---|---|
| 3,110,017 | 11/1963 | Thornton | 340—174 |
| 3,329,940 | 7/1967 | Barnes et al. | 340—174 |
| 3,435,427 | 3/1969 | Schaefer | 340—174 |
| 3,441,918 | 4/1969 | Glock | 340—174 |

OTHER REFERENCES

"Crossover Balanced Inhibit Segments," IBM Technical Disclosure Bulletin, vol. 6, No. 4, September 1963.

"Interlocking Segmentation of Large Memories," IBM Technical Disclosure Bulletin, vol. 1, No. 6, 1959 (April).

JAMES W. MOFFITT, Primary Examiner